US012621333B1

(12) United States Patent
Maheshwari et al.

(10) Patent No.: US 12,621,333 B1
(45) Date of Patent: May 5, 2026

(54) SYSTEM, METHOD, AND COMPUTER PROGRAM FOR CONTEXT ENRICHMENT OF LOGS IN A CYBERSECURITY SYSTEM

(71) Applicant: Exabeam, Inc., Foster City, CA (US)

(72) Inventors: Dinesh Maheshwari, San Ramon, CA (US); Kenshin Sakura, San Francisco, CA (US)

(73) Assignee: Exabeam, Inc., Foster City, CA (US)

( * ) Notice: Subject to any disclaimer, the term of this patent is extended or adjusted under 35 U.S.C. 154(b) by 326 days.

(21) Appl. No.: 18/140,386

(22) Filed: Apr. 27, 2023

(51) Int. Cl.
*H04L 9/40* (2022.01)
*G06F 16/2455* (2019.01)

(52) U.S. Cl.
CPC .... *H04L 63/1433* (2013.01); *G06F 16/24552* (2019.01); *G06F 16/24568* (2019.01); *H04L 63/1425* (2013.01)

(58) Field of Classification Search
CPC ............. H04L 63/1433; H04L 63/1425; G06F 16/24552; G06F 16/24568
See application file for complete search history.

(56) References Cited

U.S. PATENT DOCUMENTS

| | | | |
|---|---|---|---|
| 5,941,947 | A | 8/1999 | Brown et al. |
| 6,223,985 | B1 | 5/2001 | DeLude |
| 6,594,481 | B1 | 7/2003 | Johnson et al. |
| 7,181,768 | B1 | 2/2007 | Ghosh et al. |
| 7,624,277 | B1 | 11/2009 | Simard et al. |
| 7,668,776 | B1 | 2/2010 | Ahles |

| | | | |
|---|---|---|---|
| 8,326,788 | B2 | 12/2012 | Allen et al. |
| 8,443,443 | B2 | 5/2013 | Nordstrom et al. |
| 8,479,302 | B1 | 7/2013 | Lin |
| 8,484,230 | B2 | 7/2013 | Harnett et al. |
| 8,539,088 | B2 | 9/2013 | Zheng |
| 8,583,781 | B2 | 11/2013 | Raleigh |
| 8,606,913 | B2 | 12/2013 | Lin |
| 8,676,273 | B1 | 3/2014 | Fujisake |
| 8,850,570 | B1 | 9/2014 | Ramzan |

(Continued)

OTHER PUBLICATIONS

Bahnsen, Alejandro Correa "Classifying Phishing URLs Using Recurrent Neural Networks", IEEE 2017, 8 pages.

(Continued)

*Primary Examiner* — Andrew Suh

(74) *Attorney, Agent, or Firm* — Lessani Law Group, PC

(57) ABSTRACT

The present disclosure describes a system, method, and computer program for enriching logs with cybersecurity threat information. The system receives a first input data stream with logs usable for cybersecurity evaluation and a second input data stream with data values (e.g., IP address, user IDs, etc.) that are associated with a cybersecurity threat ("threat values"). The system stores the threat values in a datastore as they are received. As logs are received, the system enriches each log having a data value that matches a threat value in the datastore. As compared to conventional systems, the system significantly reduces the number of context queries on the datastore by using a probabilistic filter to determine if there is a zero or non-zero probability of a data value in a log being one of the threat values. If there is a zero probability, the system is able to determine that the log does not have one of the threat values and, thus, can enrich the log based solely on the output of the probabilistic filter.

20 Claims, 6 Drawing Sheets

(56) References Cited

U.S. PATENT DOCUMENTS

| | | |
|---|---|---|
| 8,881,289 B2 | 11/2014 | Basavapatna et al. |
| 9,055,093 B2 | 6/2015 | Borders |
| 9,081,958 B2 | 7/2015 | Ramzan et al. |
| 9,129,110 B1 | 9/2015 | Mason et al. |
| 9,185,095 B1 | 11/2015 | Moritz et al. |
| 9,189,623 B1 | 11/2015 | Lin et al. |
| 9,202,052 B1 | 12/2015 | Fang et al. |
| 9,680,938 B1 | 6/2017 | Gil et al. |
| 9,690,938 B1 | 6/2017 | Saxe et al. |
| 9,692,765 B2 | 6/2017 | Choi et al. |
| 9,760,240 B2 | 9/2017 | Maheshwari et al. |
| 9,779,253 B2 | 10/2017 | Mahaffey et al. |
| 9,798,883 B1 | 10/2017 | Gil et al. |
| 9,832,138 B1 | 11/2017 | Skalski et al. |
| 9,843,596 B1 | 12/2017 | Averbuch et al. |
| 9,898,604 B2 | 2/2018 | Fang et al. |
| 10,063,582 B1 | 8/2018 | Feng et al. |
| 10,095,871 B2 | 10/2018 | Gil et al. |
| 10,178,108 B1 | 1/2019 | Lin et al. |
| 10,348,740 B2 * | 7/2019 | Thrash .................... G06F 21/56 |
| 10,354,015 B2 | 7/2019 | Kalchbrenner et al. |
| 10,360,387 B2 | 7/2019 | Jou et al. |
| 10,397,272 B1 | 8/2019 | Bruss et al. |
| 10,419,470 B1 | 9/2019 | Segev et al. |
| 10,445,311 B1 | 10/2019 | Saurabh et al. |
| 10,467,631 B2 | 11/2019 | Dhurandhar et al. |
| 10,474,828 B2 | 11/2019 | Gil et al. |
| 10,496,815 B1 | 12/2019 | Steiman et al. |
| 10,621,343 B1 | 4/2020 | Maciejak et al. |
| 10,645,109 B1 | 5/2020 | Lin et al. |
| 10,685,293 B1 | 6/2020 | Heimann et al. |
| 10,803,183 B2 | 10/2020 | Gil et al. |
| 10,819,724 B2 | 10/2020 | Amiri et al. |
| 10,841,338 B1 | 11/2020 | Lin et al. |
| 10,887,325 B1 | 1/2021 | Lin et al. |
| 10,944,777 B2 | 3/2021 | Lin et al. |
| 11,017,173 B1 | 5/2021 | Lu et al. |
| 11,080,483 B1 | 8/2021 | Islam et al. |
| 11,080,591 B2 | 8/2021 | van den Oord et al. |
| 11,128,600 B2 * | 9/2021 | Bansal ................ H04L 41/0846 |
| 11,140,167 B1 | 10/2021 | Lin et al. |
| 11,151,471 B2 | 10/2021 | Niininen et al. |
| 11,178,168 B1 | 11/2021 | Lin et al. |
| 11,245,716 B2 | 2/2022 | Roelofs et al. |
| 11,423,143 B1 | 8/2022 | Lin et al. |
| 11,431,741 B1 | 8/2022 | Lin et al. |
| 11,463,331 B1 | 10/2022 | Arlitt et al. |
| 11,625,366 B1 | 4/2023 | Steiman et al. |
| 11,736,527 B1 | 8/2023 | Durairaj et al. |
| 11,843,505 B1 | 12/2023 | Cruise et al. |
| 11,956,253 B1 | 4/2024 | Lin et al. |
| 12,034,732 B2 | 7/2024 | Lin et al. |
| 12,063,226 B1 | 8/2024 | Lin et al. |
| 12,164,402 B1 | 12/2024 | Xie et al. |
| 2002/0107926 A1 | 8/2002 | Lee |
| 2003/0065926 A1 | 4/2003 | Schultz et al. |
| 2003/0147512 A1 | 8/2003 | Abburi |
| 2004/0073569 A1 | 4/2004 | Knott et al. |
| 2006/0090198 A1 | 4/2006 | Aaron |
| 2007/0156771 A1 | 7/2007 | Hurley et al. |
| 2007/0282778 A1 | 12/2007 | Chan et al. |
| 2008/0028467 A1 | 1/2008 | Kommareddy et al. |
| 2008/0040802 A1 | 2/2008 | Pierson et al. |
| 2008/0170690 A1 | 7/2008 | Tysowski |
| 2008/0262990 A1 | 10/2008 | Kapoor et al. |
| 2008/0301780 A1 | 12/2008 | Ellison et al. |
| 2009/0144095 A1 | 6/2009 | Shahi et al. |
| 2009/0171752 A1 | 7/2009 | Galvin et al. |
| 2009/0292954 A1 | 11/2009 | Jiang et al. |
| 2009/0293121 A1 | 11/2009 | Bigus et al. |
| 2010/0125911 A1 | 5/2010 | Bhaskaran |
| 2010/0191763 A1 | 7/2010 | Wu |
| 2010/0269175 A1 | 10/2010 | Stolfo et al. |
| 2010/0284282 A1 | 11/2010 | Golic |
| 2011/0167495 A1 | 7/2011 | Antonakakis et al. |

| | | |
|---|---|---|
| 2012/0278021 A1 | 11/2012 | Lin et al. |
| 2012/0316835 A1 | 12/2012 | Maeda et al. |
| 2012/0316981 A1 | 12/2012 | Hoover et al. |
| 2013/0080631 A1 | 3/2013 | Lin |
| 2013/0086273 A1 | 4/2013 | Wray et al. |
| 2013/0117554 A1 | 5/2013 | Ylonen |
| 2013/0197998 A1 | 8/2013 | Buhrmann et al. |
| 2013/0227643 A1 | 8/2013 | Mccoog et al. |
| 2013/0268260 A1 | 10/2013 | Lundberg et al. |
| 2013/0305357 A1 | 11/2013 | Ayyagari et al. |
| 2013/0340028 A1 | 12/2013 | Rajagopal et al. |
| 2014/0007238 A1 | 1/2014 | Magee |
| 2014/0090058 A1 | 3/2014 | Ward et al. |
| 2014/0101759 A1 | 4/2014 | Antonakakis et al. |
| 2014/0315519 A1 | 10/2014 | Nielsen |
| 2014/0365418 A1 * | 12/2014 | Grant .................. H04L 63/1441 |
| | | 706/52 |
| 2015/0026027 A1 | 1/2015 | Priess et al. |
| 2015/0039543 A1 | 2/2015 | Athmanathan et al. |
| 2015/0046969 A1 | 2/2015 | Abuelsaad et al. |
| 2015/0100558 A1 | 4/2015 | Fan |
| 2015/0121503 A1 | 4/2015 | Xiong |
| 2015/0205944 A1 | 7/2015 | Turgeman |
| 2015/0215325 A1 | 7/2015 | Ogawa |
| 2015/0339477 A1 | 11/2015 | Abrams et al. |
| 2015/0341379 A1 | 11/2015 | Lefebvre et al. |
| 2015/0363691 A1 | 12/2015 | Gocek et al. |
| 2016/0005044 A1 | 1/2016 | Moss et al. |
| 2016/0021117 A1 | 1/2016 | Harmon et al. |
| 2016/0063397 A1 | 3/2016 | Ylipaavalniemi et al. |
| 2016/0292592 A1 | 10/2016 | Patthak et al. |
| 2016/0306965 A1 | 10/2016 | Iyer et al. |
| 2016/0364427 A1 | 12/2016 | Wedgeworth, III |
| 2017/0019506 A1 | 1/2017 | Lee et al. |
| 2017/0024135 A1 | 1/2017 | Christodorescu et al. |
| 2017/0127016 A1 | 5/2017 | Yu et al. |
| 2017/0155652 A1 | 6/2017 | Most et al. |
| 2017/0161451 A1 | 6/2017 | Weinstein et al. |
| 2017/0178026 A1 | 6/2017 | Thomas et al. |
| 2017/0213025 A1 | 7/2017 | Srivastav et al. |
| 2017/0223035 A1 | 8/2017 | Watanabe |
| 2017/0236081 A1 | 8/2017 | Grady Smith et al. |
| 2017/0264679 A1 | 9/2017 | Chen et al. |
| 2017/0318034 A1 | 11/2017 | Holland et al. |
| 2017/0322959 A1 | 11/2017 | Tidwell et al. |
| 2017/0323636 A1 | 11/2017 | Xiao et al. |
| 2018/0004961 A1 | 1/2018 | Gil et al. |
| 2018/0039699 A1 | 2/2018 | Wan et al. |
| 2018/0048530 A1 | 2/2018 | Nikitaki et al. |
| 2018/0063168 A1 | 3/2018 | Sofka |
| 2018/0069893 A1 | 3/2018 | Amit et al. |
| 2018/0075343 A1 | 3/2018 | van den Oord et al. |
| 2018/0089304 A1 | 3/2018 | Vizer et al. |
| 2018/0097822 A1 | 4/2018 | Huang et al. |
| 2018/0144139 A1 | 5/2018 | Cheng et al. |
| 2018/0157963 A1 | 6/2018 | Salti et al. |
| 2018/0165554 A1 | 6/2018 | Zhang et al. |
| 2018/0181883 A1 | 6/2018 | Ikeda |
| 2018/0190280 A1 | 7/2018 | Cui et al. |
| 2018/0234443 A1 | 8/2018 | Wolkov et al. |
| 2018/0248895 A1 | 8/2018 | Watson et al. |
| 2018/0285340 A1 | 10/2018 | Murphy et al. |
| 2018/0288063 A1 | 10/2018 | Koottayi et al. |
| 2018/0288086 A1 | 10/2018 | Amiri et al. |
| 2018/0307994 A1 | 10/2018 | Cheng et al. |
| 2018/0316701 A1 | 11/2018 | Holzhauer et al. |
| 2018/0322368 A1 | 11/2018 | Zhang et al. |
| 2019/0014149 A1 | 1/2019 | Cleveland et al. |
| 2019/0028496 A1 | 1/2019 | Fenoglio et al. |
| 2019/0034641 A1 | 1/2019 | Gil et al. |
| 2019/0066185 A1 | 2/2019 | More et al. |
| 2019/0080225 A1 | 3/2019 | Agarwal |
| 2019/0089721 A1 | 3/2019 | Pereira et al. |
| 2019/0103091 A1 | 4/2019 | Chen |
| 2019/0114419 A1 | 4/2019 | Chistyakov et al. |
| 2019/0122078 A1 | 4/2019 | Ura et al. |
| 2019/0124045 A1 | 4/2019 | Zong et al. |
| 2019/0124093 A1 * | 4/2019 | Sharma .................. H04L 49/70 |
| 2019/0132629 A1 | 5/2019 | Kendrick |

(56) References Cited

U.S. PATENT DOCUMENTS

| | | |
|---|---|---|
| 2019/0149565 A1 | 5/2019 | Hagi et al. |
| 2019/0171655 A1 | 6/2019 | Psota et al. |
| 2019/0173804 A1 | 6/2019 | Nicas et al. |
| 2019/0182280 A1 | 6/2019 | La Marca et al. |
| 2019/0205750 A1 | 7/2019 | Zheng et al. |
| 2019/0207969 A1 | 7/2019 | Brown |
| 2019/0213247 A1 | 7/2019 | Pala et al. |
| 2019/0244603 A1 | 8/2019 | Angkititrakul et al. |
| 2019/0303703 A1 | 10/2019 | Kumar et al. |
| 2019/0318100 A1 | 10/2019 | Bhatia et al. |
| 2019/0334784 A1 | 10/2019 | Kvernvik et al. |
| 2019/0349400 A1 | 11/2019 | Bruss et al. |
| 2019/0378051 A1 | 12/2019 | Widmann et al. |
| 2019/0384762 A1 | 12/2019 | Hill et al. |
| 2020/0021607 A1 | 1/2020 | Muddu et al. |
| 2020/0021620 A1 | 1/2020 | Purathepparambil et al. |
| 2020/0034481 A1 | 1/2020 | Asplund et al. |
| 2020/0082098 A1 | 3/2020 | Gil et al. |
| 2020/0137104 A1 | 4/2020 | Hassanzadeh et al. |
| 2020/0177618 A1 | 6/2020 | Hassanzadeh et al. |
| 2020/0228557 A1 | 7/2020 | Lin et al. |
| 2020/0302118 A1 | 9/2020 | Cheng et al. |
| 2020/0327886 A1 | 10/2020 | Shalaby et al. |
| 2021/0081459 A1 | 3/2021 | Chung |
| 2021/0089884 A1 | 3/2021 | Macready et al. |
| 2021/0125050 A1 | 4/2021 | Wang |
| 2021/0126938 A1 | 4/2021 | Trost et al. |
| 2021/0133331 A1 | 5/2021 | Lipkis et al. |
| 2021/0182612 A1 | 6/2021 | Zeng et al. |
| 2021/0232768 A1 | 7/2021 | Ling et al. |
| 2021/0248240 A1* | 8/2021 | Comish ................. G06F 21/577 |
| 2022/0006814 A1 | 1/2022 | Lin et al. |
| 2022/0030017 A1 | 1/2022 | Infante-Lopez et al. |
| 2022/0076164 A1 | 3/2022 | Conort et al. |
| 2022/0147622 A1 | 5/2022 | Chesla |
| 2022/0245093 A1 | 8/2022 | Batsakis et al. |
| 2024/0289464 A1* | 8/2024 | Tishbi ................... G06F 21/577 |

OTHER PUBLICATIONS

Chen, Jinghui, et al., "Outlier Detection with Autoencoder Ensembles", Proceedings of the 2017 SIAM International Conference on Data Mining, pp. 90-98.

Cooley, R., et al., "Web Mining: Information and Pattern Discovery on the World Wide Web", Proceedings Ninth IEEE International Conference on Tools with Artificial Intelligence, Nov. 3-8, 1997, pp. 558-567.

DatumBox Blog, "Machine Learning Tutorial: The Naïve Bayes Text Classifier", DatumBox Machine Learning Blog and Software Development News, Jan. 2014, pp. 1-11.

Fargo, Farah "Resilient Cloud Computing and Services", PhD Thesis, Department of Electrical and Computer Engineering, University of Arizona, 2015, pp. 1-115.

Freeman, David, et al., "Who are you? A Statistical Approach to Measuring User Authenticity", NDSS, Feb. 2016, pp. 1-15.

Goh, Jonathan et al., "Anomaly Detection in Cyber Physical Systems using Recurrent Neural Networks", IEEE 2017, pp. 140-145.

Guo, Diansheng et al., "Detecting Non-personal and Spam Users on Geo-tagged Twitter Network", Transactions in GIS, 2014, pp. 370-384.

Ioannidis, Yannis, "The History of Histograms (abridged)", Proceedings of the 29th VLDB Conference (2003), pp. 1-12.

Kim, Jihyun et al., "Long Short Term Memory Recurrent Neural Network Classifier for Intrusion Detection", IEEE 2016, 5 pages.

Malik, Hassan, et al., "Automatic Training Data Cleaning for Text Classification", 11th IEEE International Conference on Data Mining Workshops, 2011, pp. 442-449.

Mietten, Markus et al., "ConXsense-Automated Context Classification for Context-Aware Access Control", Asia CCS'14, 2014, pp. 293-304.

Poh, Norman, et al., "EER of Fixed and Trainable Fusion Classifiers: A Theoretical Study with Application to Biometric Authentication Tasks", Multiple Classifier Systems, MCS 2005, Lecture Notes in Computer Science, vol. 3541, pp. 1-11.

Shi, Yue et al., "Cloudlet Mesh for Securing Mobile Clouds from Intrusions and Network Attacks", 2015 3rd IEEE International Conference on Mobile Cloud Computing, Services, and Engineering, pp. 109-118.

Taylor, Adrian et al., "Anomaly Detection in Automobile Control Network Data with Long Short-Term Memory Networks", IEEE 2016, pp. 130-139.

Taylor, Adrian "Anomaly-Based Detection of Malicious Activity in In-Vehicle Networks", Ph.D. Thesis, University of Ottawa 2017, 151 pages.

Wang, Alex Hai, "Don't Follow Me Spam Detection in Twitter", International Conference on Security and Cryptography, 2010, pp. 1-10.

Wang, Shuhao et al., "Session-Based Fraud Detection in Online E-Commerce Transactions Using Recurrent Neural Networks", 2017, 16 pages.

Zhang, Ke et al., "Automated IT System Failure Prediction: A Deep Learning Approach", IEEE 2016, pp. 1291-1300.

* cited by examiner

ALTERNATE EMBODIMENT WITH BOTH LOCAL AND REMOTE CACHES FOR DATA VALUES ASSOCIATED WITH A THREAT

ALTERNATE EMBODIMENT WITH BOTH LOCAL AND REMOTE CACHES FOR DATA VALUES ASSOCIATED WITH A THREAT

SYSTEM, METHOD, AND COMPUTER PROGRAM FOR CONTEXT ENRICHMENT OF LOGS IN A CYBERSECURITY SYSTEM

BACKGROUND OF THE INVENTION

1. Field of the Invention

This invention relates generally to cybersecurity systems, and, more specifically, to enriching logs with cybersecurity threat information.

2. Description of the Background Art

Cybersecurity systems monitor entity behavior in a network in order to detect cybersecurity threats. An entity may be a user or a machine. As entities interact with the network, various systems generate raw logs related to the entity behavior. For example, a cybersecurity system may obtain raw data logs related to a user's interactions with the IT infrastructure, such as user logon events, server access events, application access events, and data access events. The raw data logs may be obtained from third party systems. Cybersecurity system will typically take these raw data logs and generate event logs from the raw data logs.

For entity behavior modeling in IT network security analytics, it is critical to leverage contextual information to improve alert accuracy. For example, contextual information can be used to construct and evaluate context-specific rules. As a result, event logs are often supplemented with additional data that provides further context for the entity events. For example, if an event relates to an IP address associate with prior cybersecurity threats, this is important context information for evaluating current threats. The supplementing of logs with additional context information is known as "context enrichment."

FIG. 1 illustrates the conventional method for context enrichment in substantially real time. A context-enrichment module 110 receives a data stream of logs (i.e., log pipeline 120) and a data stream of context data (i.e., data pipeline 130). The goal is to join the logs with the context data as the logs are received in real time. To do so, local in-memory databases 140 are created for the logs, and local in-memory databases 150 are created for the context data. The context-enrichment module performs "map/shuttle/reduce" operations on the in-memory databases to obtain cross-joined data 160. Local in-memory databases (as opposed to remote, distributed caches) are required using this technique in order to provide substantially real-time context enrichment. The module outputs the enriched logs into downstream pipeline 170.

This process consumes a huge amount of computing and memory resources. For example, processing 100 million event logs per second using this conventional method would require several hundred gigs of RAM.

As cybersecurity becomes increasingly more important in this digital age, large, distributed cybersecurity systems likely need to scale beyond enriching 100 million logs per second per region. To achieve this, it is essential to perform context enrichment in a way that minimizes the hit to the log pipeline throughput. As such, context queries need to be completed with low latency (e.g., less than 1 millisecond per query) and support high concurrency. Such low-latency requirements require in-memory storage techniques, as going to disk to fetch context data is too slow for such use cases.

Therefore, there is demand for a context-enrichment method that satisfies the low latency requirements required to significantly scale real-time context enrichment capabilities while at the same time using significantly less computing and memory requirements than known methods.

SUMMARY OF THE DISCLOSURE

The present disclosure describes a system, method, and computer program for enriching logs with cybersecurity threat information. The system receives a first input data stream with logs usable for cybersecurity evaluation and a second input data stream with data values (e.g., IP address, user IDs, etc.) that are associated with a cybersecurity threat ("threat values"). The system stores the threat values in a first datastore as they are received. As the logs are received, the system enriches each log having a data value that matches a threat value in the datastore to indicate that the data value is associated with a cybersecurity threat. As compared to conventional systems, the system significantly reduces the number of context queries on the datastore by using a probabilistic filter to determine if there is a zero or non-zero probability of a log having one of the threat values. If there is a zero probability of a log having one of the threat values, the system enriches the log based solely on the output of the probabilistic filter. If there is a non-zero probability of the log having one of the threat values, the system queries the first datastore to see if there is a threat value matching a data value in the log.

As compared to conventional context-enrichment techniques, the novel method disclosed herein significantly reduces the number of context queries on a database of threat values. For example, it is typical for about 1% of IP addresses in logs processed by a cybersecurity system to be IP addresses associated with a known threat. In such case, the IP address in the logs will match a threat value in the first datastore only about 1% of the time. The majority of IP addresses in logs processed by the cybersecurity system will have a zero probability of being in the first datastore. In this scenario, the probabilistic filter significantly reduces the queries on the first datastore in that the system can enrich the majority of the logs (e.g., 90% or more) without needing to query the first datastore. This requires significantly less memory and computational resources than conventional context-enrichment techniques in which a data query and a data join is performed for each log. As described above, in order to achieve substantially real-time context enrichment, conventional techniques require all the threat values to be stored locally in in-memory databases for each computer on which context-enrichment is performed. With the novel method disclosed herein, threat values can be stored in a remote, distributed cache, and substantially real-time context enrichment can be achieved since the system does not need to query the cache for each log it enriches.

In one embodiment, a method for enriching logs with cybersecurity threat information comprises the following steps:

> receiving a first input data stream and a second input data stream, wherein the first input data stream includes logs usable for cybersecurity evaluation and the second input data stream includes data values that are associated with a cybersecurity threat;
>
> storing the data values associated with the cybersecurity threat in a first datastore;
>
> for each log in the first data stream having a select data field, processing the log by performing the following:
>
>> identifying a data value in the select data field;

using a probabilistic filter to determine whether there is a zero probability of the first datastore having a data value matching the data value in the select data field;

in response to there being a zero probability of the first datastore having the matching data value, determining that there is no indication in the first datastore that the data value in the select data field is associated with a cybersecurity threat and enriching the log to indicate that the data value in the select data field is not associated with a cybersecurity threat;

in response to there being a non-zero probability of the first datastore having the matching data value, searching the first datastore for the matching data value and, in response to finding the matching data value in the first datastore, enriching the log to indicate that the data value in the select data field is associated with a cybersecurity threat; and outputting the processed log into an output data stream.

DETAILED DESCRIPTION OF THE PREFERRED EMBODIMENTS

The present disclosure describes a system, method, and computer program for enriching logs with cybersecurity threat information. The methods disclosed herein enable low-latency (e.g., less than 1 millisecond per log) and high-throughput (e.g., 100 million logs/per second) context enrichment while using less memory and computing resources than conventional methods. As will be described in more detail below, this is achieved by using a probabilistic filter to significantly reduce the number of context queries need to perform the context enrichment.

The methods disclosed herein are performed by a computer system that detects cybersecurity threats in a network ("the system," "the cybersecurity system" or "the computer-based cybersecurity system"). The cybersecurity system may be a user behavior analytics (UBA) system or a user-and-entity behavior analytics system (UEBA). An example of a UBA/UEBA cybersecurity monitoring system is described in U.S. Pat. No. 9,798,883 issued on Oct. 24, 2017, and titled "System, Method, and Computer Program for Detecting and Assessing Security Risks in a Network," the contents of which are incorporated by reference herein. Another example of a cybersecurity system is set forth in U.S. Pat. No. 11,178,168 issued on Nov. 16, 2021, and titled "Self-Learning Cybersecurity Threat Detection System, Method, and Computer Program for Multi-Domain Data," the contents of which are incorporated by reference herein.

Figure 1:
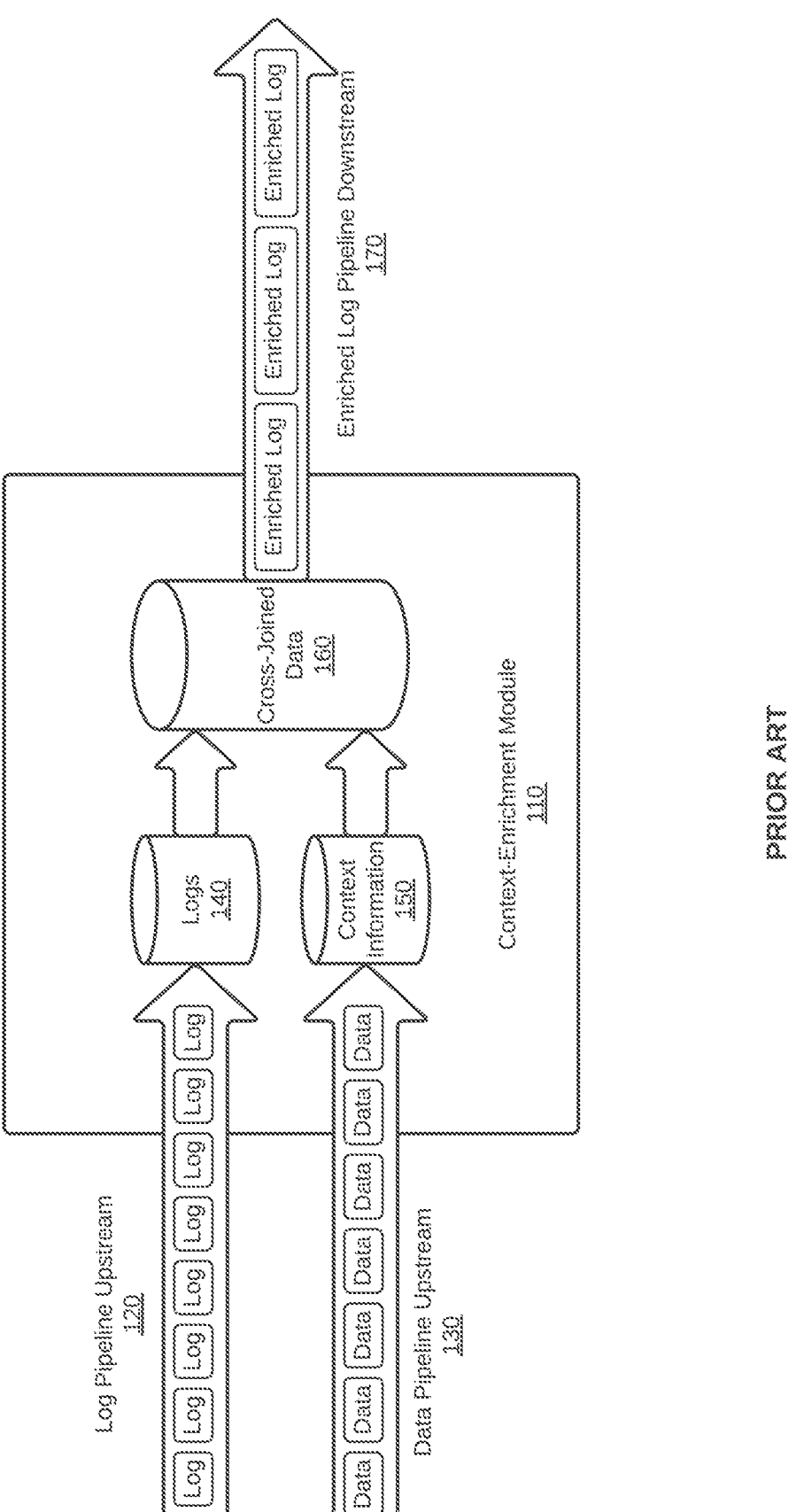
FIG. 1 is a block diagram that illustrates a prior art context-enrichment method for a cybersecurity system.
Figure 2:
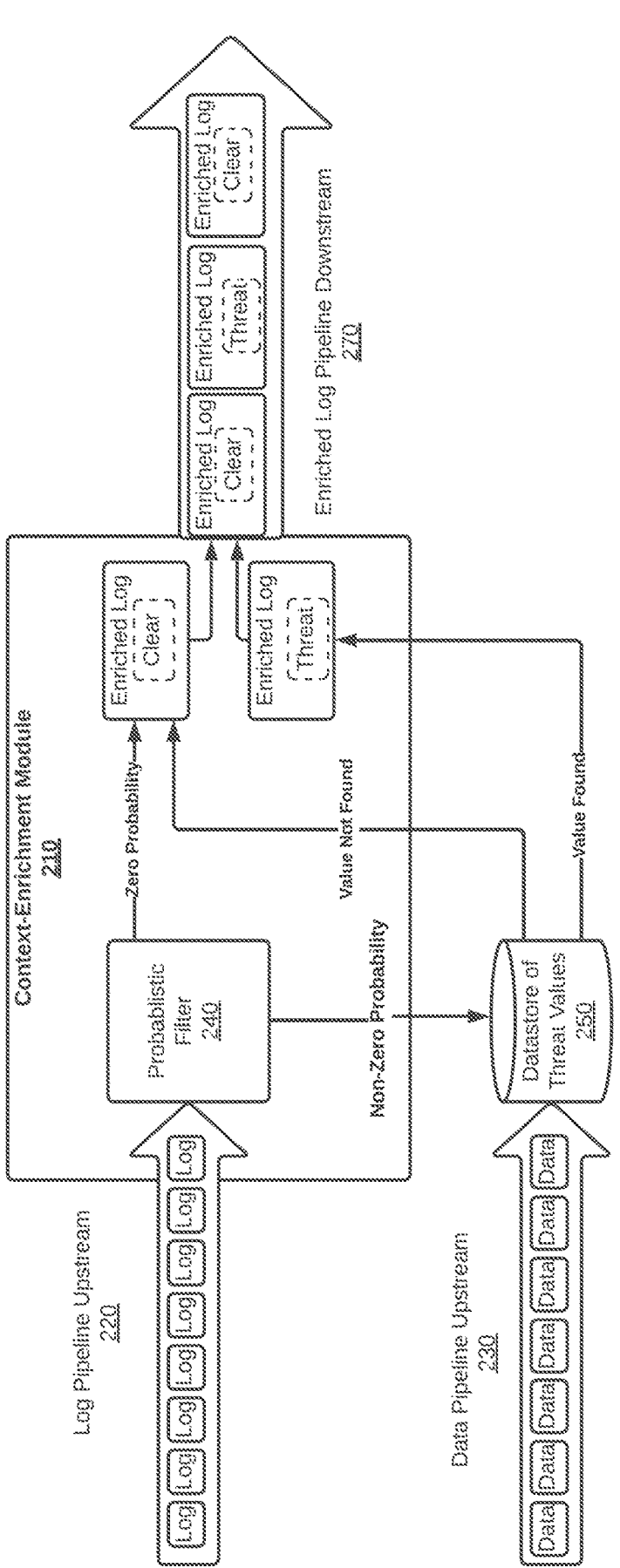
FIG. 2 is a block diagram that illustrates a novel context-enrichment method for a cybersecurity system according to one embodiment.
Figure 3:
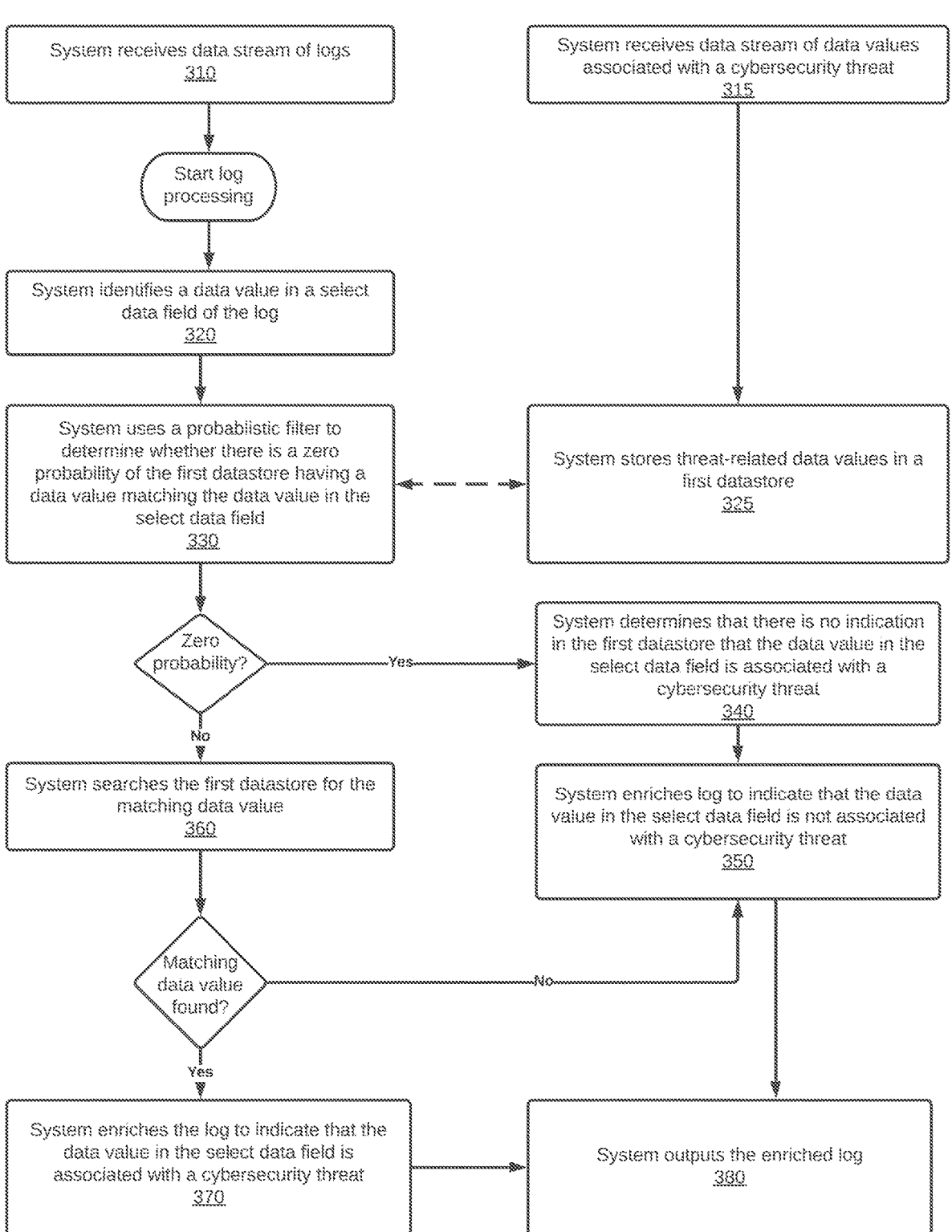
FIG. 3 is a flowchart that illustrates a novel context-enrichment method for a cybersecurity system according to one embodiment.

FIGS. 2 and 3 illustrates a system and method for enriching logs with cybersecurity threat information according to one embodiment. As shown in FIG. 2, the cybersecurity system includes a context-enrichment software module 210 that performs the process of enriching the logs. The context-enrichment module 210 includes a probabilistic filter 240, such as a Bloom filter, that is able to determine whether there is a zero or non-zero probability of a datastore having a certain data value.

The cybersecurity system receives a data stream of logs 220 (step 310) at the context enrichment module 210. The logs may be raw data logs, event logs, or any other types of logs or messages usable for cybersecurity evaluation. In parallel, the system also receives a data stream 230 of data values associated with a cybersecurity threat (step 315) "threat values." These are received at a first datastore 250. In one embodiment, datastore 250 is an in-memory distributed cache that is remote from the context enrichment module 210.

For each log in data stream 220, the system (specifically, the context enrichment module 210) identifies a data value in a select data field of the log ("the identified data value") (step 320). For example, this may be an IP address or a user ID. The system uses the probabilistic filter 240 to determine whether there is a zero probability of the identified data value having a matching data value in the datastore 250 (step 330). In other words, the system uses a probabilistic filter 240 to determine if the identified data value in the log cannot be one of the threat values in the datastore 250.

In one embodiment, the probabilistic filter works as follows: The probabilistic filter includes an index with m bits, wherein each bit can have the value 0 or 1 (or T/F, or any other binary value system). All bits in the index initially start out with a zero value. The probabilistic filter applies a plurality of hash functions having a range of 1 to m to the threat values in the datastore. For each hash of a threat value, the probabilistic filter sets the corresponding bit in the index to a 1. For example, if there are five hash functions, and if the five hashes of a threat value are 4, 16, 33, 50, and 98, then the $4^{th}$, $16^{th}$, $33^{rd}$, $50^{th}$, and $98^{th}$ bits in the index are set to 1. To determine whether there is a zero probability of an identified data value being in the datastore, the probabilistic filter applies the same hash functions to the identified data value. If all the bits in the index corresponding to the hashes of the identified data value are set to 1, then there is a non-zero probability that the identified data value is one of the threat values in the datastore. However, if any of the corresponding bits in the index are set to zero, then there is a zero probability that the identified data value is one of the threat values in the datastore.

If the probabilistic filter outputs a zero probability of the identified data value being one of the threat values in the datastore, the system determines that there is no indication in the first datastore that the identified data value in the log is associated with a cybersecurity threat (step 340). Therefore, the system is able to process the log without searching the first datastore for the matching value. Specifically, the system enriches the log to indicate that the data value in the select data field is not associated with a cybersecurity threat (step 350). The log is enriched based on the output of the probabilistic filter and not by performing a query on the datastore. In an alternate embodiment, the log may be outputted without the addition of an enrichment field. In such embodiment, downstream modules in the cybersecurity system will interpret the lack of such field as an indication that the data value is not associated with a cybersecurity threat.

If the probabilistic filter outputs a non-zero probability of the identified data value being one of the threat values in the first datastore, the system searches the first datastore for the matching data value (step 360). If the matching data value is found, then the system enriches the log to indicate that the identified data value is associated with a cybersecurity threat (step 370). Otherwise, the system enriches the log to indicate that the identified data value is not associated with a cybersecurity threat (step 350). The system then outputs the processed logs into downstream pipeline 270 (step 380).

If the select data field in the log is an IP address field, then the threat values in the datastore 250 may be IP addresses associated with previous cybersecurity threats, such as ransomware, phishing, malware, or a trojan attack. Likewise, if the select data field in the log is a user ID, then the values in the datastore 250 may be user IDs associated comprised users, malicious users, watched user, high-value user, etc.

As compared to conventional context-enrichment techniques, the novel method disclosed herein significantly reduces the number of context queries on a database of threat values. For example, it is typical for about 1% of IP addresses in logs processed by a cybersecurity system to be IP addresses associated with a known threat. In such case, the IP address in the logs will match a threat value in the first datastore only about 1% of the time. The majority of IP addresses in logs processed by the cybersecurity system will have a zero probability of being in the first datastore. In this scenario, the probabilistic filter significantly reduces the queries on the first datastore in that the system can enrich the majority of the logs (e.g., 90% or more) without needing to query the first datastore. This requires significantly less memory and computation resources than conventional context-enrichment techniques in which a data query and a data join is performed for each log. As described above, in order to achieve substantially real-time context enrichment, conventional techniques require all the threat values to be stored locally in in-memory databases for each computer on which context-enrichment is performed. With the novel method disclosed herein, threat values can be stored in a remote, distributed cache and substantially real-time context enrichment can be achieved since the system does not need to query the cache for each log it enriches.

There are a number of different ways in which the system may enrich logs to indicate whether or not the identified data value is associated with a cybersecurity threat. These include, but are not limited to:

1. Adding a field or message block to the log that indicates whether or not the identified data value is associated with a threat. For example, the system may add a "threat" field and set the value to either "True" or "1", or "False" or "0." Leaving the "threat" field blank can also be an indication that the identified data value is not associated with a threat.
2. Adding a new field (value does not matter) or message block to the logs with identified data values that are associated with a threat. No field or message block is added to the logs where there is a zero probability of the identified data value being one of the threat values in the datastore. Modules in the cybersecurity system that are downstream of the context-enrichment module will interpret the lack of the new field/message in a log as meaning that the data value in the select field of the log is not associated with a cybersecurity threat.
3. For each log, a separate message is added to the output stream to indicated whether or not the log has a data value associated with a cybersecurity threat. The message is separate from the log itself, but it is still considered to "enrich" the log, as it provides additional context for the log.

Furthermore, in an alternate embodiment, instead of enriching logs to indicate whether or not the identified data value is associated with a threat, the log may be enriched to provide other context information about the identified data value, such as whether a user is a high-value user.

Figure 4:
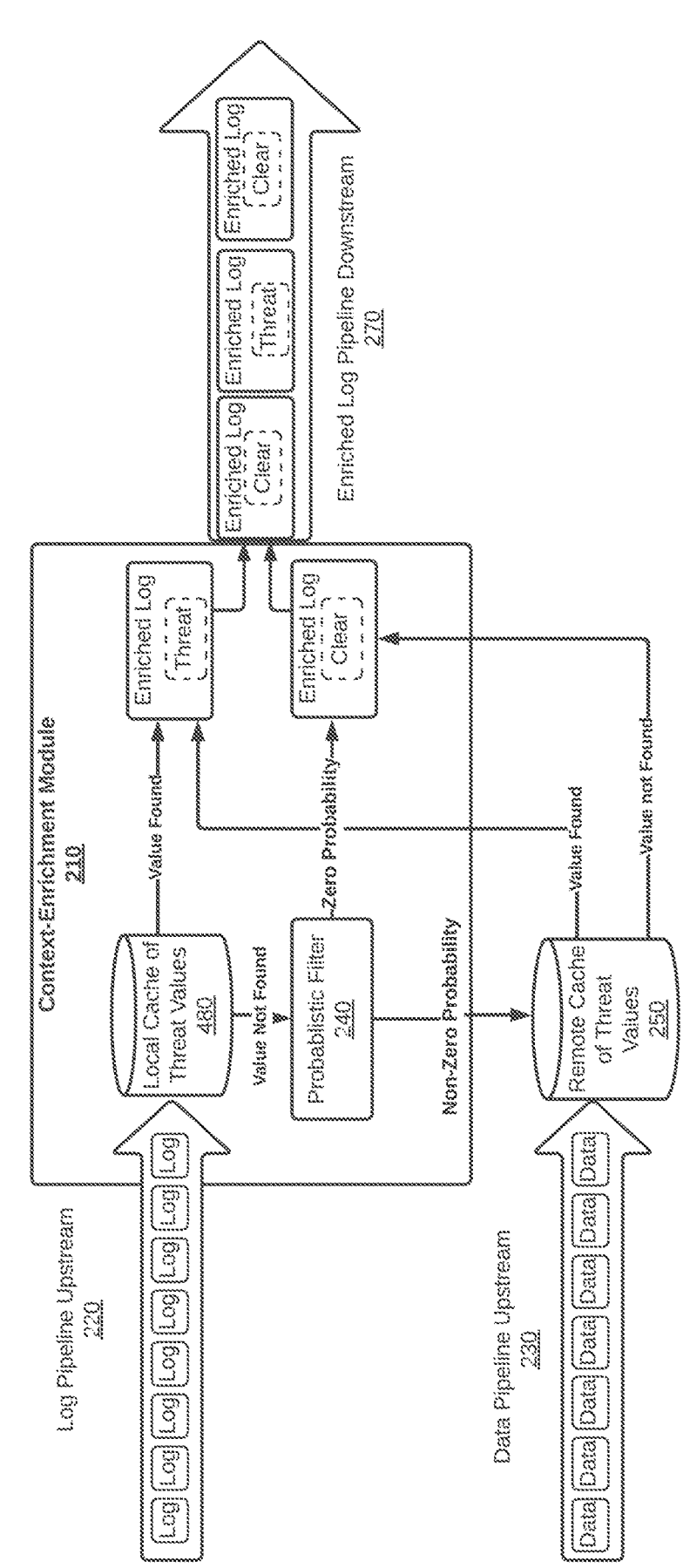
FIG. 4 is a block diagram that illustrates a novel context-enrichment method for a cybersecurity system according to an alternate embodiment.
Figure 5A:
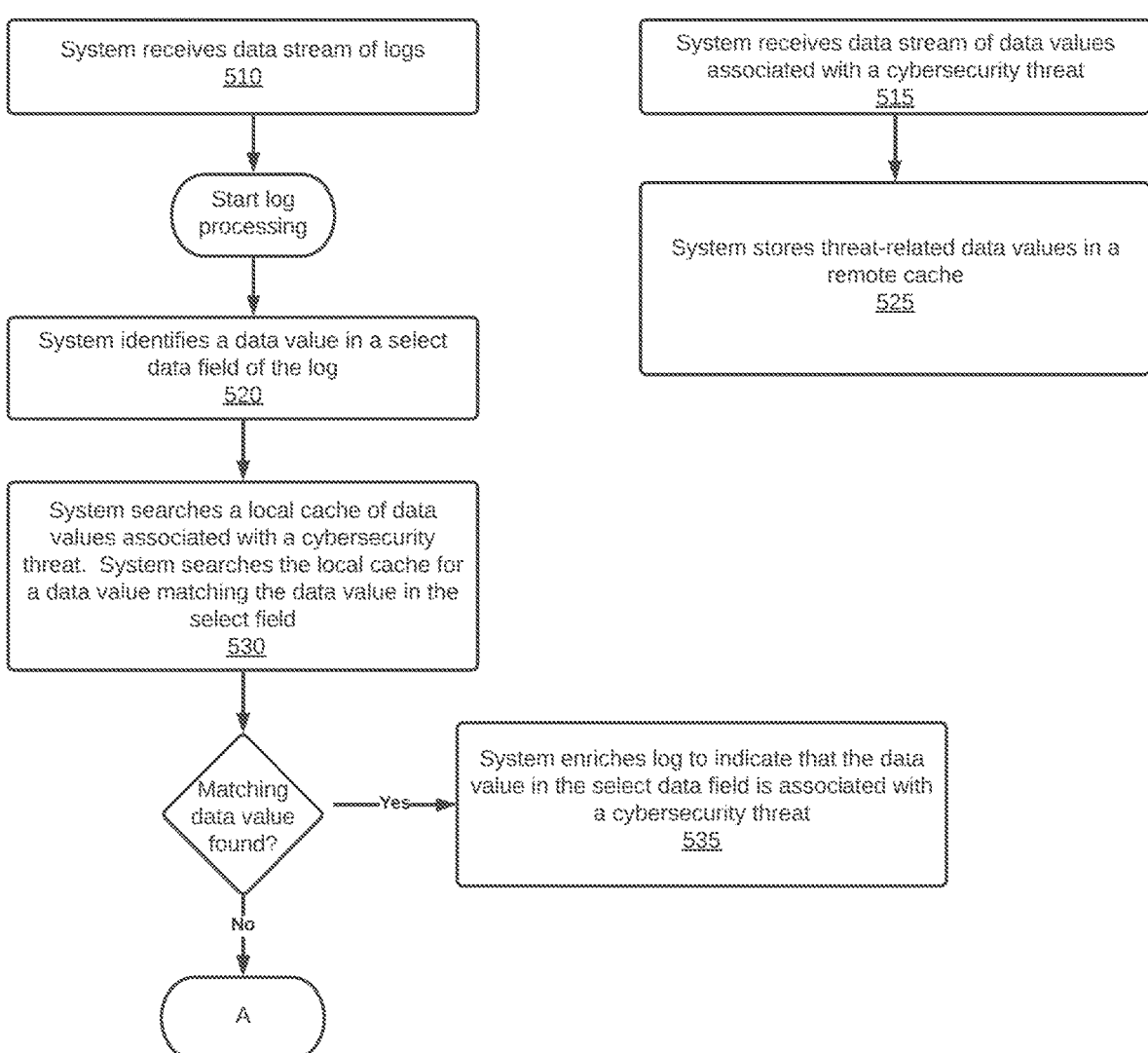
FIGS. 5A-5B are flowcharts that illustrate a novel context-enrichment method for a cybersecurity system according to an alternate embodiment.

FIGS. 4 and 5 illustrate an alternate embodiment for performing context enrichment. In this embodiment, the context-enrichment module includes a local datastore 480 of threat values. The local store includes a subset of the threat values that are in a remote datastore 250. In one embodiment, the local datastore 480 is a local cache running on the same server as the context-enrichment module 210, and the remote datastore 250 is a remote, distributed in-memory cache that runs on different servers than the context-enrichment module 210.

As is the case with the embodiment described with respect to FIGS. 2-3, in the embodiment of FIGS. 4-5, the cybersecurity system receives a data stream of logs 220 (step 510) at the context enrichment module 210. In parallel, the system also receives a data stream 230 of data values associated with a cybersecurity threat (step 515). These are received and stored at remote cache 250 (step 525).

Figure 5B:
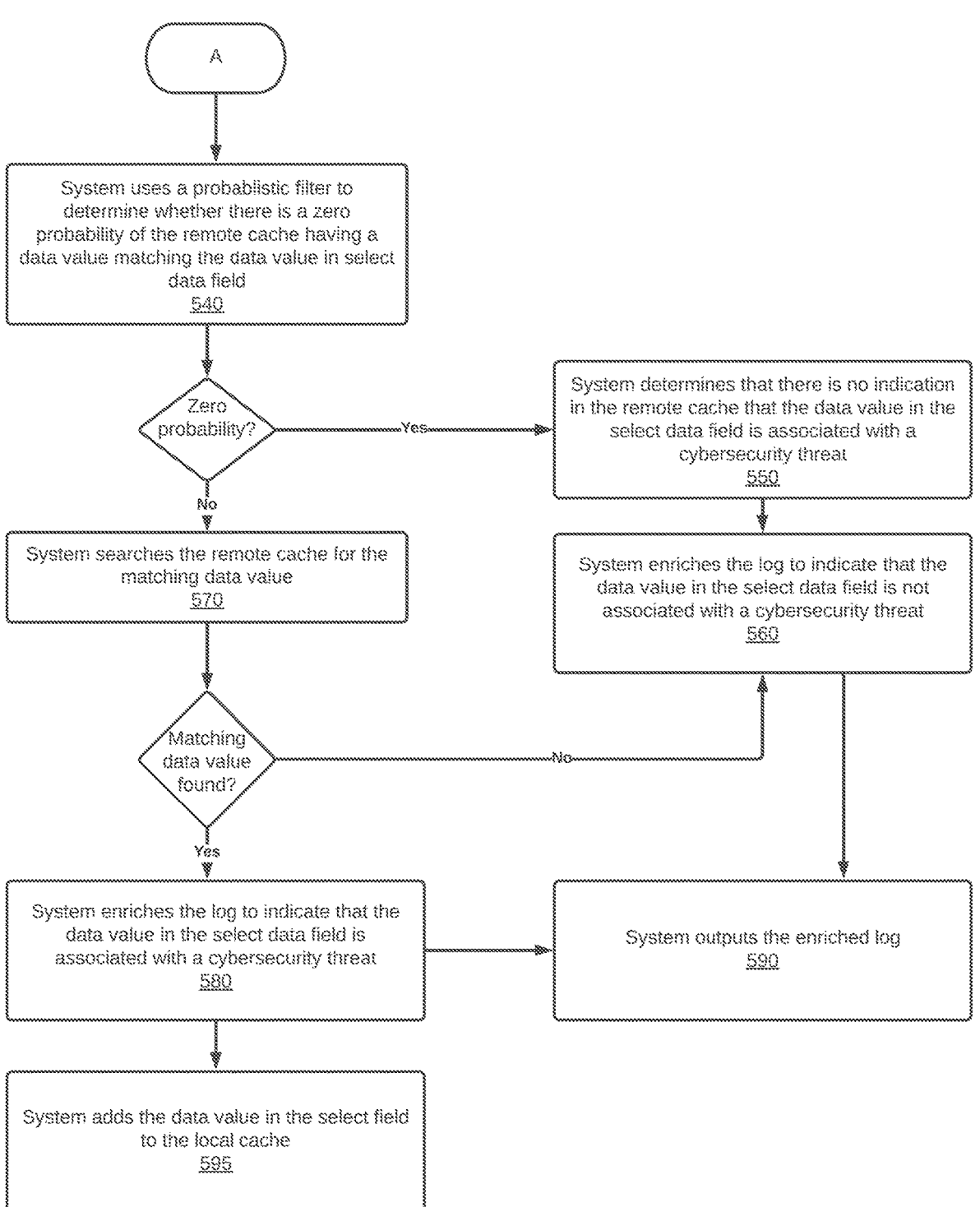

For each log in data stream 220, the system (specifically, the context enrichment module 210) identifies a data value in a select data field of the log (step 520). The system searches the local cache 480 of threat values to determine if the local cache has a data value matching the identified data value (step 530). If so, this means that the identified data value is one of the threat values in the local cache 480, and the system enriches the log to indicate that the identified data value is associated with a cybersecurity threat (step 535). If not, the system proceeds with the steps of using the probabilistic filter to determine whether there is a zero or non-zero probability of the remote cache 250 having a matching data value. Steps 540-590 in FIG. 5B are the same as steps 330-380 in FIG. 3. If a matching data value is found in remote cache 250, said data value is then added to the local cache 480 (step 595). Older data values (e.g., values that have gone the longest time without matches) in local cache 480 may be expelled as newer values come in.

The methods described with respect to FIGS. 1-5 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A non-transitory computer-readable medium comprising a computer program, that, when executed by a computer system, enables the computer system to perform the following method for enriching logs with cybersecurity threat information, the method comprising:

receiving a first input data stream and a second input data stream, wherein the first input data stream includes logs usable for cybersecurity evaluation and the second input data stream includes data values that are associated with a cybersecurity threat;

storing the data values associated with the cybersecurity threat in a first datastore;

for each log in the first input data stream having a select data field, processing the log by performing the following:

identifying a data value in the select data field;

using a probabilistic filter to determine whether there is a zero probability of the first datastore having a data value matching the data value in the select data field;

in response to there being a zero probability of the first datastore having the matching data value, determining that there is no indication in the first datastore that the data value in the select data field is associated with a cybersecurity threat;

in response to there being a non-zero probability of the first datastore having the matching data value, searching the first datastore for the matching data value and, in response to finding the matching data value in the first datastore, enriching the log to indicate that the data value in the select data field is associated with a cybersecurity threat; and outputting the log into an output data stream.

2. The non-transitory computer-readable medium of claim 1, further comprising:

in response to there being a zero probability of the first datastore having the matching data value, enriching the log to indicate that the data value in the select data field is not associated with a cybersecurity threat.

3. The non-transitory computer-readable medium of claim 1, wherein the logs relate to one or more computer-based systems being monitored by a cybersecurity system.

4. The non-transitory computer-readable medium of claim 1, wherein the data values in the first datastore are IP addresses associated with one or more of the following: ransomware, phishing, malware, and a trojan attack.

5. The non-transitory computer-readable medium of claim 1, wherein the data values in the first datastore are user IDs associated with one or more of the following: a compromised user, a malicious user, a watched user, and a high value user.

6. The non-transitory computer-readable medium of claim 1, wherein a subset of the data values in the second input data stream are stored in a second datastore and wherein prior to the step of using the probabilistic filter, the method further comprises:

for each log having the select data field, searching the second datastore for a data value matching the data value in the select data field;

in response to finding the matching data value in the second datastore, enriching the log to indicate that the data value in the select data field is associated with a cybersecurity threat, bypassing the probabilistic filter and the first datastore, and outputting the enriched log in the output data stream; and in response to not finding the matching data value in the second datastore, proceeding with the step of using the probabilistic filter.

7. The non-transitory computer-readable medium of claim 6, wherein the first datastore is a distributed datastore and the second datastore is a local datastore.

8. The non-transitory computer-readable medium of claim 7, wherein the first datastore is a distributed in-memory cache and the second datastore is a local cache running on the system on which the logs are received.

9. The non-transitory computer-readable medium of claim 7, wherein, in response to searching and finding the matching data value in the distributed in-memory cache, adding the matching data value to the local cache.

10. A computer system for enriching logs with cybersecurity threat information, the system comprising:

one or more processors;

one or more memory units coupled to the one or more processors, wherein the one or more memory units store instructions that, when executed by the one or more processors, cause the system to perform the operations of:

receiving a first input data stream and a second input data stream, wherein the first input data stream includes logs usable for cybersecurity evaluation and the second input data stream includes data values that are associated with a cybersecurity threat;

storing the data values associated with the cybersecurity threat in a first datastore;

for each log in the first input data stream having a select data field, processing the log by performing the following:

identifying a data value in the select data field;

using a probabilistic filter to determine whether there is a zero probability of the first datastore having a data value matching the data value in the select data field;

in response to there being a zero probability of the first datastore having the matching data value, determining that there is no indication in the first datastore that the data value in the select data field is associated with a cybersecurity threat;

in response to there being a non-zero probability of the first datastore having the matching data value, searching the first datastore for the matching data value and, in response to finding the matching data value in the first datastore, enriching the log to indicate that the data value in the select data field is associated with a cybersecurity threat; and outputting the log into an output data stream.

11. The system of claim 10, further comprising:

in response to there being a zero probability of the first datastore having the matching data value, enriching the log to indicate that the data value in the select data field is not associated with a cybersecurity threat.

12. The system of claim 10, wherein the data values in the first datastore are IP addresses associated with one or more of the following: ransomware, phishing, malware, and a trojan attack.

13. The system of claim 10, wherein the data values in the first datastore are user IDs associated with one or more of the following: a compromised user, a malicious user, a watched user, and a high value user.

14. The system of claim 10, wherein a subset of the data values in the second input data stream are stored in a second datastore and wherein prior to the step of using the probabilistic filter, the method further comprises:

for each log having the select data field, searching the second datastore for a data value matching the data value in the select data field;

in response to finding the matching data value in the second datastore, enriching the log to indicate that the data value in the select data field is associated with a cybersecurity threat, bypassing the probabilistic filter and the first datastore, and outputting the enriched log in the output data stream; and in response to not finding the matching data value in the second datastore, proceeding with the step of using the probabilistic filter.

15. The system of claim 14, wherein the first datastore is a distributed in-memory cache and the second datastore is a local cache running on the computer on which the logs are received.

16. A method, performed by a computer-based cybersecurity system, for enriching logs with cybersecurity threat information, the method comprising:

receiving a first input data stream and a second input data stream, wherein the first input data stream includes logs usable for cybersecurity evaluation and the second input data stream includes data values that are associated with a cybersecurity threat;

storing the data values associated with the cybersecurity threat in a first datastore;

for each log in the first input data stream having a select data field, processing the log by performing the following:

identifying a data value in the select data field;

using a probabilistic filter to determine whether there is a zero probability of the first datastore having a data value matching the data value in the select data field;

in response to there being a zero probability of the first datastore having the matching data value, determining that there is no indication in the first datastore that the data value in the select data field is associated with a cybersecurity threat;

in response to there being a non-zero probability of the first datastore having the matching data value, searching the first datastore for the matching data value and, in response to finding the matching data value in the first datastore, enriching the log to indicate that the data value in the select data field is associated with a cybersecurity threat; and outputting the enriched log into an output data stream.

17. The method of claim 16 further comprising:

in response to there being a zero probability of the first datastore having the matching data value, enriching the log to indicate that the data value in the select data field is not associated with a cybersecurity threat.

18. The method of claim 16, wherein the data values in the first datastore are IP addresses associated with one or more of the following: ransomware, phishing, malware, and a trojan attack.

19. The method of claim 16, wherein the data values in the first datastore are user IDs associated with one or more of the following: a compromised user, a malicious user, a watched user, and a high value user.

20. The method of claim 16, wherein a subset of the data values in the second input data stream are stored in a second datastore and wherein prior to the step of using the probabilistic filter, the method further comprises:

for each log having the select data field, searching the second datastore for a data value matching the data value in the select data field;

in response to finding the matching data value in the second datastore, enriching the log to indicate that the data value in the select data field is associated with a cybersecurity threat, bypassing the probabilistic filter and the first datastore, and outputting the enriched log in the output data stream; and in response to not finding the matching data value in the second datastore, proceeding with the step of using the probabilistic filter.

* * * * *